May 27, 1958     C. W. STEWART     2,836,065
COMBINATION METER TOP AND REGULATOR
Filed Aug. 17, 1954
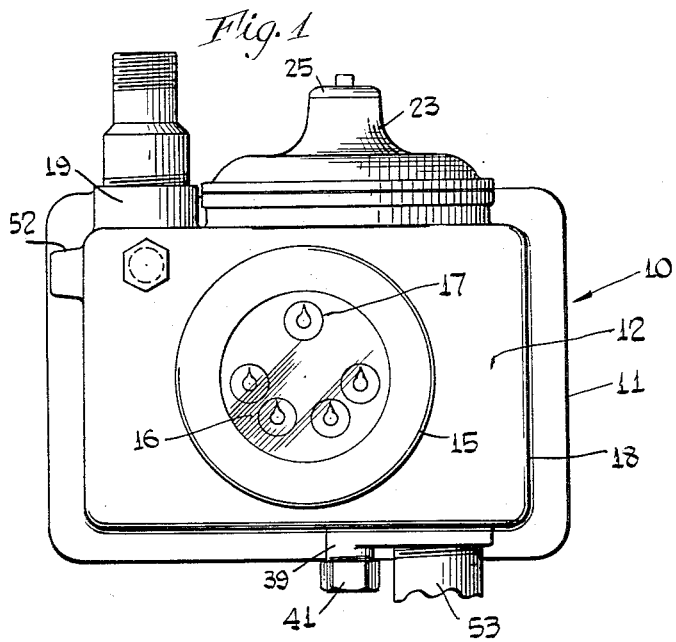
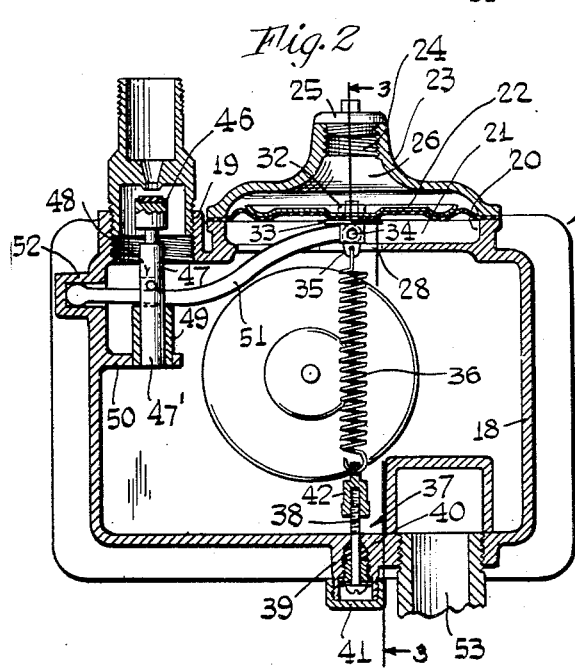
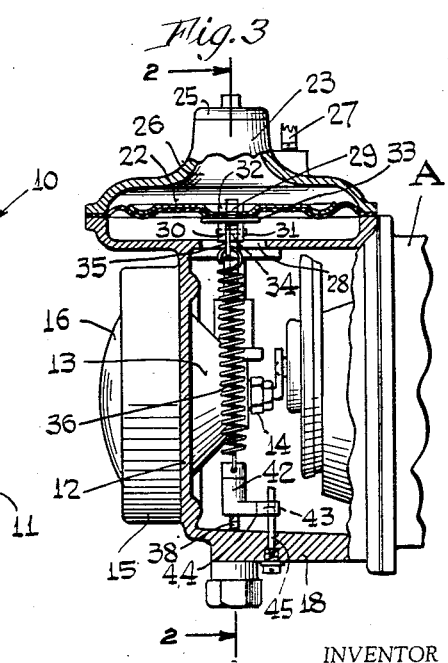
INVENTOR
Charles W. Stewart
BY Johnson and Kline
ATTORNEYS United States Patent Office 2,836,065
Patented May 27, 1958

2,836,065

COMBINATION METER TOP AND REGULATOR

Charles W. Stewart, Fairfield, Conn., assignor to The Sprague Meter Company, Bridgeport, Conn., a corporation of Connecticut Application August 17, 1954, Serial No. 450,497

2 Claims. (Cl. 73—199)

This invention relates to a combined regulator and gas meter, and in particular to a novel arrangement of parts forming a compact meter top construction having a protected adjustable regulator spring therein.

Herefore, it was customary in a pressure regulator to have a diaphragm dividing the regulator into a vent chamber and a pressure chamber and to locate the diaphragm loading means generally in the form of a compression spring in the regulator venting chamber which was open to the atmosphere. Because it was so open moisture and impurities in the atmosphere would collect in the venting chamber thereby causing the spring and connected diaphragm adjusting means therein to rust and corrode. Eventually the operation of the regulator would become so impaired as to render it useless thereby causing serious effects in the system.

The present invention overcomes these prior difficulties by locating the regulator spring so that it is protected from the damage of rust and corrosion produced by contact therewith of air, moisture, and other impurities of the atmosphere which normally collect in the vent chamber thereby extending substantially the operating usefulness of the regulator. This is accomplished by locating the regulator spring within the top of the meter and on the pressure side of the regulator thereby sealing it off from the vent side which is exposed to the atmosphere and its inherent impurities. In the preferred form of the invention the spring is a tension spring and extends transversely within the top of the meter and has one end connected to the diaphragm and the other end secured to adjusting means for controlling the tension thereon and the load on the diaphragm. With the spring so located it will be exposed to the natural lubricants inherent in the gas flowing through the meter and thus be protected and maintained in good working condition throughout a longer life.

The present invention not only provides for protecting the spring against corrosion and rust, but by being enclosed in the meter top on the pressure side of the regulator also solves a problem existent in curb type meters where restricted space becomes a problem, for in accordance with the present invention with the spring disposed within the top housing of the meter, I have been able to reduce the size of the portion of the regulator forming the vent chamber by eliminating therefrom the projecting portion thereon normally carrying the compression spring for loading the diaphragm, thus producing a compact top construction.

A feature of this invention resides in the simplicity and relatively inexpensive meter top and combined regulator which is preferably made of a cast material and requiring relatively few machining operations.

Another feature of this invention is the forming of a regulator having a short vent chamber combined with a meter top having a register thereon forming a compact meter top of particular utility for curb type installations.

Still another feature of the compact combined meter top having a register and regulator resides in locating the register on the meter top and having the pressure regulator offset or off to one side of the register so that the spring extending into and across said top will not interfere with the registering means positioned on the top Other features and advantages will hereinafter appear.

In the accompanying drawings:

Figure 1 is a plan view of the improved top for a curb-type meter.

Fig. 2 is a sectional view of the improved meter top taken along line 2—2 on Fig. 3.

Fig. 3 is a sectional view of the meter top taken along line 3—3 on Fig. 2.

The invention relates to a novel top construction for a meter in which the spring for a pressure regulator mounted thereon is located so as to be protected from rust and the like. This construction may be particularly suitable for use in a curb meter because of its compact assembly for housing an index register and having built therein a pressure regulator thereby forming a combined and compact index-regulator meter top.

The illustrated form of the invention comprises a meter box top 10 which is provided with a main body portion 11. The body portion is preferably made of a cast material that is relatively simple in design, economic to manufacture being substantially free of expensive machine surfaces and compact in form. The body has a face 12 having a recessed portion shown at 13 for supporting an index registering mechanism 14. Surrounding the index mechanism is an annular boss 15 projected outwardly from the face 12 and providing a window portion in the form of a transparent panel 16 which is positioned therein for protecting and facilitating viewing of the register indicator 17.

Depending from said face is an enclosing wall portion 18 which together with the face portion 12 forms the housing of the meter top which is adapted to be fastened to a standard meter casing A.

The enclosing wall has an inlet port 19 for connecting to a source of gas supply. Adjacent the inlet port 19 and formed on a portion of the outer surface of the wall 18 is a recess 20 forming a pressure chamber 21. The peripheral portion of the recess 20 supports a flexible diaphragm 22 which overlies the pressure chamber 21. Securing the diaphragm in fixed position thereon is a regulator cover 23 having a threaded opening 24 closed by an access plug 25 which forms the vent chamber of the regulator. The diaphragm 22 forms an imperforate wall member which separates the pressure chamber 21 from the vent chamber 26 and which also functions as a gasket to prevent any leakage between the periphery of the recessed portion and the cover 23. The cover 23 shown in the preferred embodiment is dome-shaped and has the usual vent 27 that opens the venting chamber 26 to the atmosphere.

In accordance with the present invention the recessed portion 20 has an opening 28 substantially centrally thereof and disposed under the diaphragm. Connected to the diaphragm on the pressure side and aligned with the opening thereof is a lever yoke 29 having a pair of spaced ears 30 and 31. The lever yoke 29 is secured to the diaphragm by means of a nut 32 and a lever yoke plate 33. Secured between the ears 30 and 31 by a pin 34 is an anchor plate 35 to which is connected a diaphragm regulating spring 36 which is preferably in the form of a tension spring.

The spring extends through the opening 28 and across the housing of the meter top so that it may be completely encased on the pressure side of the regulator to protect it from the rust and corroding impurities of the atmosphere to which it was heretofore exposed when positioned on the vent side of the regulator. Positioning the said spring on the pressure side extends substantially the operating usefulness of the said regulator, and decreases materially the maintenance necessary to keep the regulator in working condition. Also by positioning the spring in the meter top on the pressure side the useful life of the spring is further enhanced because the said spring is exposed to the natural lubricant inherent in the gas flowing therethrough; which will inhibit further any rusting or corroding action.

My novel construction also enables the cover 23 to be materially flatter or shorter than that heretofore used when a compression spring was mounted therein, since it is no longer necessary to provide the regulator vent cover 23 with an extension for housing a diaphragm loading spring as was formally the practice. This reduction in the occupying space of the meter top is of particular importance in curb meter type installations where the limitation of space is critical. However, it will be noted that because of this important space reducing feature, a meter top of the present invention is desirable for other and different types of installation where limitation of space is critical. The shorter vent cover described further reduces the weight and packing space required of the meter which greatly reduces the shipping and handling cost while facilitating the same.

Carried by a wall portion opposite the opening 28 is an adjusting means 37 comprising an adjusting screw 38. The adjusting screw 38 is seated in a boss 39 and extends through the wall portion. A packing 40 surrounds the adjusting screw to prevent leakage and the boss 39 is capped by cup member 41 to prevent unauthorized tampering with the adjustment after it is set.

An L-shaped holder 42 is threaded to said adjusting screw having an aperture 43 in the foot 44 of the L. Adjacent to the adjusting screw is fixed a guide post 45. The holder is arranged so that the guide post 45 projects up through the aperture 43 in the foot 44 for guiding the holder and also to prevent turning of the same during the adjustment of the load on the diaphragm as the adjusting screw is rotated in the desired direction.

The spring 36, which is connected to the diaphragm anchor plate 35 at one end, extends through the opening 28 and into the housing formed by the enclosing walls 18 and is fastened at its other end to the holder 42 adjacent the wall portion opposite said opening. Thus the load on the diaphragm may be adjusted by simply turning the adjusting screw in the desired direction which will permit the holder 42 to ride thereon, thereby increasing or decreasing the tension of the spring as desired.

The opening 28 is located on substantially the center line of the regulator which is set off or transversely spaced from the center line of the register as best seen in Fig. 2. This offset arrangement permits the tension spring to extend across the meter top without interfering with the register means.

Connected in the inlet port 19 is a valve mechanism 46 of usual construction having a valve stem 47. The valve stem is provided with a slot 48 and has an end portion 47' thereof supported in a bearing sleeve 49 mounted on a bracket 50 formed integral with the enclosing wall.

Connecting the valve to the diaphragm is an actuating lever 51 having one end pivoted to lever yoke 29 of the diaphragm and the other end thereof threaded through the slot 48 in the valve stem and fixed for pivotal movement in a recessed well 52 formed integral with the enclosing wall portion adjacent the slot in the valve stem. The end of the lever is rounded to facilitate the pivoting movement in the well. It will be noted in Fig. 2 that the actuating lever renders the valve action responsive to the movement of the diaphragm of the pressure regulator. The top surface of the bearing acts as a limit for the downward movement of the valve.

The operation of the regulator is as follows:

After the required load is placed upon the diaphragm by the desired adjustment of the tension spring, any variation in pressure within the meter immediately acts upon the diaphragm to move the same, which movement is mechanically transmitted to the valve, thereby regulating the amount of gas flowing to the meter. In this manner the pressure in the meter is automatically maintained so that the gas flows out at a substantially constant pressure through the outlet port 53 which is in communication with the meter proper.

From the foregoing description it will be seen that the meter top is relatively simple in design, easily manufactured and compact in form.

The useful life of the combined meter top and regulator is materially extended by encasing the diaphragm loading spring and the adjusting means on the pressure side of the regulator so as to seal the said spring and adjusting means from the rust and corroding impurities of the atmosphere which heretofore they had always been exposed to. My novel arrangement further provides for self-lubrication of the spring and adjusting means by exposing the said spring and adjusting means to the natural lubricant inherent in the gases flowing through the pressure side of the regulator.

Also my new arrangement eliminates the necessity of a bulky vent cover, which heretofore was necessary to house the diaphragm loading spring and adjusting means, thereby reducing the weight, size, and cost thereof and greatly facilitating the handling and shipping of the same at a lower rate.

Variations and modifications may be made within the scope of the claims and portions of the improvements may be used without others.

I claim:

1. In a gas meter top having a body comprising a top face portion provided with integral enclosing walls depending therefrom forming a housing for a register means and a gas-receiving chamber, an inlet control valve within said chamber, a pressure regulator mounted on a wall portion of said body for controlling said valve and having a diaphragm separating a pressure chamber from a vent chamber, the register being mounted on the top face and said regulator being mounted on a portion of the enclosing wall off to one side of the register, the improvement wherein said enclosing wall portion supporting the regulator is provided with an opening therein disposed on the pressure side of the diaphragm, said opening interconnecting said gas-receiving chamber and pressure chamber, a spring means extending through said opening and into said gas-receiving chamber and having one end connected to the center of the diaphragm, and threaded adjusting means carried by the wall of the body opposite said opening and connected to the other end of said spring, said adjusting means having a portion extending to the exterior of the body whereby the tension in the spring and the load on the diaphragm may be controlled by said adjusting means with said spring means being completely disposed within said gas-receiving chamber free from interference with the register means.

2. In a gas meter top having a body comprising a top face portion provided with integral enclosing walls depending therefrom forming a housing for a register means, a gas receiving chamber and an inlet control valve, and a pressure regulator mounted on a wall portion of said body for controlling said valve and having a diaphragm separating a pressure chamber from the vent chamber, the improvement wherein said enclosing wall is provided with an opening therein disposed centrally on the pressure side of the diaphragm, said opening connecting with said gas receiving chamber, and wherein spring means extends through said opening and into said gas receiving chamber in offset spaced relation to the register means and has one end connected to the diaphragm, an adjusting means carried by the wall of the body opposite said opening and connected to the other end of the spring, said adjusting means comprising screw means extending through said wall portion and sealed therein to prevent leakage, an L-shaped holder having an apertured leg portion threaded on said screw, a guide member adjacent said screw fixed on said wall portion and extending through said aperture for guiding said holder and to prevent turning thereof during adjustment of said spring, said holder connected to the spring and rendering it responsive to the adjustment of the screw, whereby the tension in the spring and the load on the diaphragm may be controlled by said adjusting means with said spring means being completely disposed within said gas receiving chamber, free from interference with said register, and permitting the usual spring receiving portion of the regulator extending over the vent chamber to be materially shorter thereby reducing the occupying space of the meter top.

References Cited in the file of this patent
UNITED STATES PATENTS

| | | |
|---|---|---|
| 646,995 | Johnson | Apr. 10, 1900 |
| 1,411,228 | Taylor | Mar. 28, 1922 |
| 1,676,444 | Kitchen | July 10, 1928 |
| 2,274,697 | Hutchinson et al. | Mar. 3, 1942 |
| 2,647,404 | Whitworth | Aug. 4, 1953 |